July 10, 1923.  1,461,380
C. F. COLE
PEDAL CARRIED CIRCUIT MAKER AND BREAKER
Filed June 29, 1922  2 Sheets-Sheet 1
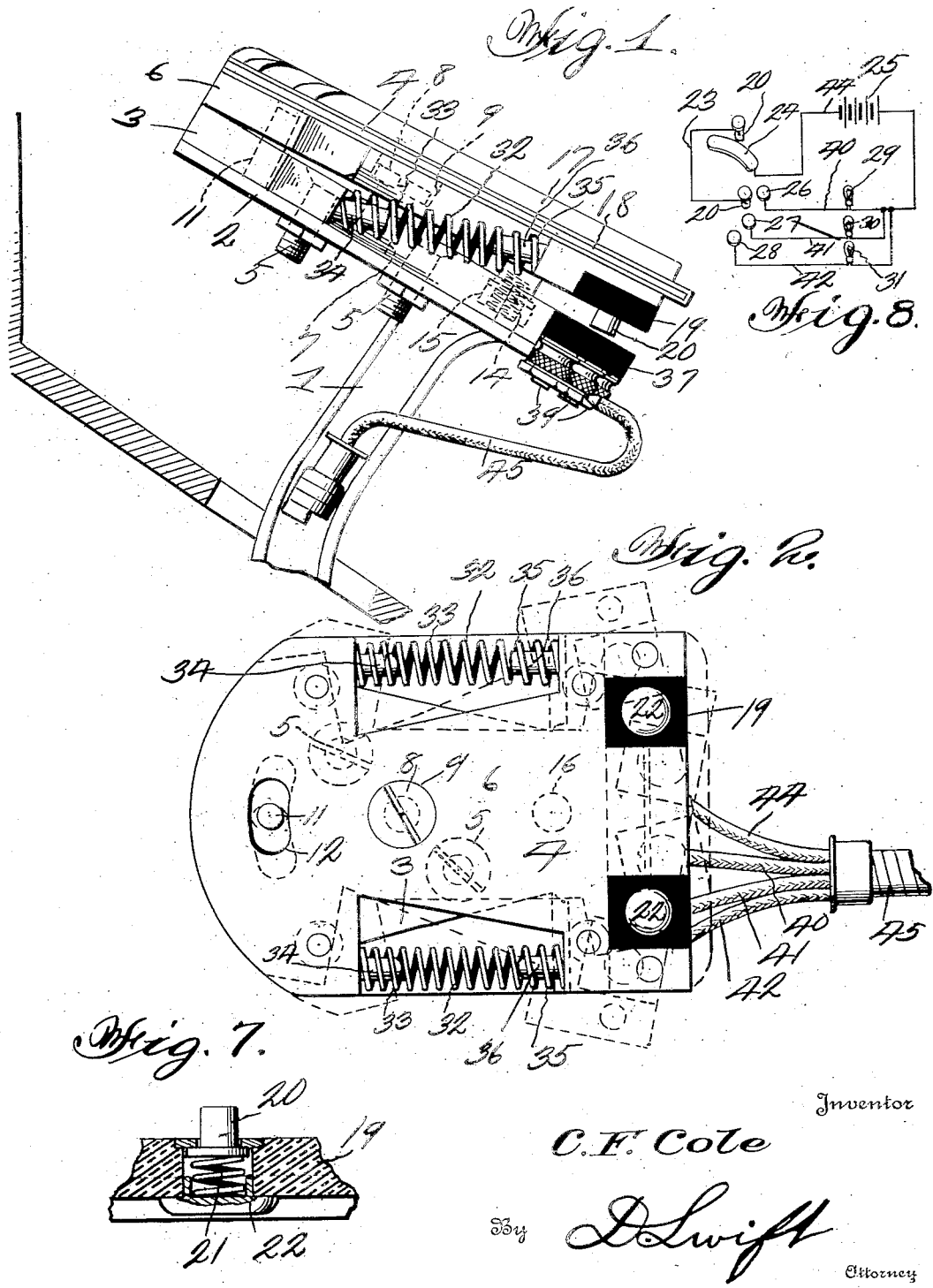
Inventor
C. F. Cole
By D. Swift
Attorney

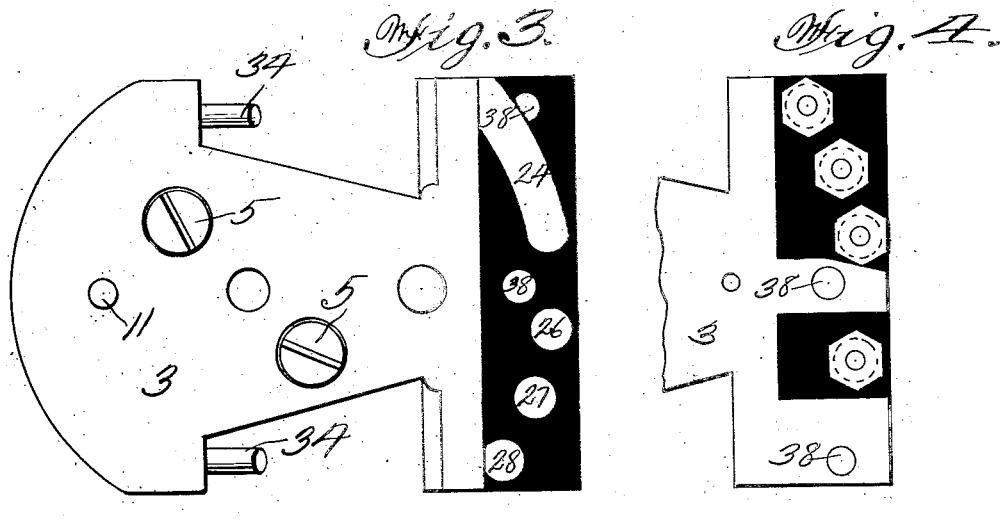
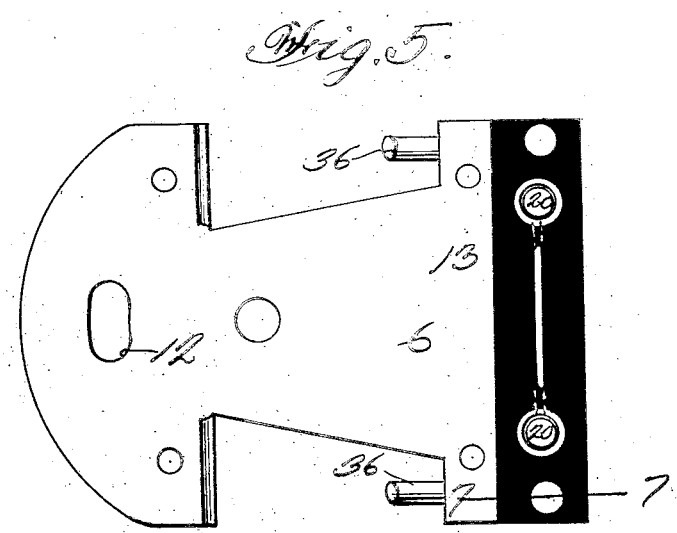
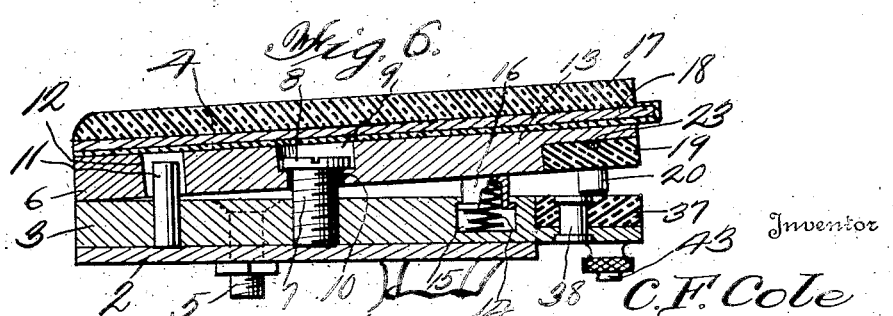

Patented July 10, 1923.

1,461,380

UNITED STATES PATENT OFFICE.

CLAUDE F. COLE, OF ATHENS, PENNSYLVANIA.

PEDAL-CARRIED CIRCUIT MAKER AND BREAKER.

Application filed June 29, 1922. Serial No. 571,770.

*To all whom it may concern:*

Be it known that I, CLAUDE F. COLE, a citizen of the United States, residing at Athens, in the county of Bradford, State of Pennsylvania, have invented a new and useful Pedal-Carried Circuit Maker and Breaker; and I do hereby declare the following to be a full, clear, and exact description of the invention, such as will enable others skilled in the art to which it appertains to make and use the same.

The invention relates to circuit makers and breakers for pedals, and has for its object to provide a device of this character adapted to be carried by the brake or clutch pedals of an automobile and controllable by the foot of the operator in such a manner that direction signalling lights may be lighted for signalling to approaching vehicles the direction of contemplated turn or the intention to stop the automobile.

A further object is to provide a pedal carried circuit maker and breaker comprising a plate adapted to be attached to the said portion of the pedal, a loosely pivoted plate pivoted to the tread carried plate and normally held spaced therefrom, the loosely pivoted plate being provided with spaced spring actuated contacts in circuit with each other and cooperating with contacts carried by the lower plate that a plurality of circuits may be controlled. Also to provide spring means for normally holding the plates substantially in registration with each other.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:—

Figure 1 is a side elevation of the device showing the same applied to a pedal.

Figure 2 is a top plan view of the device.

Figure 3 is a top plan view of the lower plate.

Figure 4 is a bottom plan view of the outer end of the lower plate.

Figure 5 is a bottom plan view of the upper plate.

Figure 6 is a longitudinal sectional view through the circuit maker and breaker.

Figure 7 is a detail sectional view taken on line 7—7 of Figure 5.

Figure 8 is a diagrammatic view of a conventional form of vehicle signalling light circuit, showing in perspective the contact members.

Referring to the drawings, the numeral 1 designates a conventional form of brake or clutch pedal of an automobile and 2 the tread plate carried thereby. The lower plate 3 of the circuit maker and breaker 4 is secured to the plate 2 by means of bolts 5. However it is to be understood that any other securing means may be utilized if so desired. The upper plate 6 is connected to the plate 3 by means of the headed screw 7, the head 8 of which is disposed in a recess 9 of the plate 8, the shank of which extends through an enlarged aperture 10, thereby allowing the plate 6 to have a pivotal as well as a rocking action. When the plate 6 is moved to either of the dotted line positions shown in Figure 2 it is limited in its movement by means of the pin 11 carried by the plate 3 engaging the ends of the arcuate slot 12 in the plate 6, the purpose of which will presently appear. The end 13 of the plate 6 is normally forced upwardly by means of a coiled spring 14 which is disposed in the recess 15 of the plate 3 and is provided with a cap 16 which slidably engages the underside of plate 6, therefore it will be seen when there is no pressure on the end 13 of the plate 6, said end will be held in raised position as shown in Figure 1. Secured to the upper side of the plate 6 is a foot engaging tread member 17 which member is formed from a plate 18 embedded in rubber or other insulating material thereby preventing short circuiting of the contact members hereinafter set forth which are carried by the plate 6 and by a transversely disposed member 19 carried by the plate 6. Disposed in the insulating member 19 are contact members 20 which are normally forced outwardly by means of coiled springs 21, which coiled springs are interposed between the contact members 20 and the caps 22. Contact members 21 are in circuit with each other through the connecting wire 23, and when the plate 6 is forced downwardly at its end 13, one of the contact members 20 engages the arcuate conductor plate 24 which is in circuit with the battery 25 and the other contact member 20 is forced into engagement with either the contact member 26, 27 and 28 according to the position to which the operator has moved the plate 6 by a slight twisting of the foot. When the contact member 20 is in engagement with the contact 26 the lamp 29 is lighted indicating to approaching vehicles that the operator contemplates a turn to the left. During this operation one of the contact members 20 engages the arcuate contact plate 24 thereby closes the circuit through the wire 23. When one of the contact members 20 engages the contact member 27 the lamp 30 is lighted, thereby signalling approaching vehicles that the operator contemplates stopping, the device being normally in position on the brake or clutch pedal for making this circuit. When the operator desires to signal an approaching vehicle that he contemplates turning to the right, the plate 6 is pivotally moved until one of the contacts 20 is over the contact member 28 and the other contact member 20 is over the arcuate contact plate 24, at which time the plate 6 is rocked downwardly at its end 19 until one of the contact members engages one of the contact members 28 which will close the circuit through the wire 23 and cause the lamp 31 to be lighted. Plates 3 and 6 are normally held in substantial registration by means of coiled springs 32, the ends 33 of which receive the lugs 34 carried by the plate 3 and disposed in cutaway portions thereof and the ends 35 receive the lugs 36 carried by the plate 6 and disposed within the cutaway portions thereof. It will be seen that with the springs 32 equally tensioned that the plates 3 and 6 will be maintained in substantial registration, and that the spring 21 will maintain the circuit making contact out of engagement. Secured to the forward end of the plate 3 is an insulating member 37, said member being secured to the plate 3 by means of rivets 38. The contact members 26, 27 and 28 are carried by the insulating member 37 and provided with binding posts 39 to which the wires 40, 41 and 42 are connected and the arcuate contact plate 24 is provided with a binding post 43 to which the battery wire 44 is connected. However all of the wires are preferably disposed in the cable 45, which cable or conduit protects the wires and allows the same to be positioned in such a manner as to not interfere with the operation of the pedal.

From the above it will be seen that a pedal carried circuit maker and breaker is provided for automobiles, by means of which circuit maker and breaker the operator may control signalling lights carried by the automobile for signalling approaching vehicles the contemplated stopping or turning of the automobile by the operator.

The invention having been set forth what is claimed as new and useful is:—

1. A circuit maker and breaker comprising a stationary plate, a movable plate loosely pivoted to said stationary plate, spring means for normally maintaining said plates in registration, an arcuate contact carried by the stationary plate, spaced contacts carried by the stationary plate to one side of the arcuate contact, spring actuated contacts carried by the pivoted plate, said spring actuated contacts being so positioned whereby when one of said contacts is in registration with either of the spaced contacts, the other spring contact will be in registration with the arcuate plate.

2. A pedal carried circuit maker and breaker, said circuit maker and breaker comprising a stationary plate having cutaway portions in the opposite sides thereof, a loosely pivoted plate carried by the stationary plate and provided with cutaway portions in the opposite sides thereof, coiled springs extending diagonally from opposite sides of the plates and forming means for maintaining said plates in substantial registration, a pin carried by the stationary plate and cooperating with the ends of an arcuate slot in the pivoted plate for limiting the movement thereof, a coiled spring interposed between the plates for forcing said plates apart at one side of the pivotal point thereof, spring actuated contacts carried by the pivoted plate, said spring actuated contacts cooperating with contacts carried by the stationary plate.

3. A pedal carried circuit maker and breaker said circuit maker and breaker comprising a stationary plate carried by the pedal, a loosely pivoted movable plate carried by the stationary plate, springs cooperating with the opposite sides of the pivoted plate for maintaining the same normally in registration with the stationary plate, means for limiting the pivotal action of the pivoted plate, means for normally forcing said plates apart at one end thereof, and contact members carried by the plates adjacent the ends which are forced apart.

In testimony whereof I have signed my name to this specification in the presence of two subscribing witnesses.

CLAUDE F. COLE.

Witnesses:
WILLIAM T. HARRINGTON.
KARL HAPEMAN.